US010899337B2

(12) United States Patent
Son et al.

(10) Patent No.: US 10,899,337 B2
(45) Date of Patent: Jan. 26, 2021

(54) HYBRID ELECTRIC VEHICLE AND METHOD OF CONTROLLING A DRIVE MODE THEREFORE

(71) Applicants: HYUNDAI MOTOR COMPANY, Seoul (KR); KIA MOTORS CORPORATION, Seoul (KR)

(72) Inventors: Hui Un Son, Seoul (KR); Jin Kyeom Cho, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 255 days.

(21) Appl. No.: 16/128,894

(22) Filed: Sep. 12, 2018

(65) Prior Publication Data
US 2019/0126904 A1    May 2, 2019

(30) Foreign Application Priority Data
Nov. 1, 2017    (KR) .......................... 10-2017-0144773

(51) Int. Cl.
B60W 20/12        (2016.01)
B60K 6/48         (2007.10)
B60W 20/13        (2016.01)
B60K 11/04        (2006.01)
B60K 11/08        (2006.01)

(52) U.S. Cl.
CPC ............... B60W 20/12 (2016.01); B60K 6/48 (2013.01); B60W 20/13 (2016.01); B60K 11/04 (2013.01); B60K 11/085 (2013.01); B60W 2510/244 (2013.01); B60W 2520/10 (2013.01); B60W 2530/16 (2013.01); B60Y 2200/92 (2013.01)

(58) Field of Classification Search
CPC ................. B60W 20/12; B60W 20/13; B60W 2510/244; B60W 2520/10; B60W 2530/16; B60K 6/48; B60K 11/04; B60K 11/085; B60Y 2200/92
See application file for complete search history.

(56) References Cited

U.S. PATENT DOCUMENTS

| 9,616,771 | B2* | 4/2017 | Grossard ................ G06Q 50/06 |
| 10,525,965 | B2* | 1/2020 | Kaun ................ B60W 50/0097 |
| 2011/0022255 | A1* | 1/2011 | Yamada ................ B60L 3/12 701/22 |

(Continued)

Primary Examiner — Jeff A Burke
Assistant Examiner — Zachary Joseph Wallace
(74) Attorney, Agent, or Firm — McDonnell Boehnen Hulbert & Berghoff LLP

(57) ABSTRACT

A hybrid electric vehicle and method of controlling a drive mode therefore is disclosed. The method includes dividing a drive route into a plurality of intervals and operating a per-interval drive load for each of a plurality of the intervals, determining a reference drive load becoming a reference of change into a second drive mode from a first drive mode according to fluctuation of a charge state of a battery using the operated per-interval drive load, and setting an interval corresponding to the reference drive load among a plurality of the intervals as a first drive mode drive interval or a drive interval having the first drive mode and the second drive mode coexist therein. The setting is performed by considering a speed of the interval corresponding to the reference drive load and a speed of a next interval on the drive route.

11 Claims, 8 Drawing Sheets

(56) References Cited

U.S. PATENT DOCUMENTS

| | | | | |
|---|---|---|---|---|
| 2013/0096749 A1* | 4/2013 | Hussain | ................ | B60W 10/08 |
| | | | | 701/22 |
| 2015/0061855 A1* | 3/2015 | Klimesch | .............. | B60W 10/08 |
| | | | | 340/455 |
| 2015/0134206 A1* | 5/2015 | Matsunaga | ........... | B60W 20/12 |
| | | | | 701/48 |
| 2015/0274028 A1* | 10/2015 | Payne | ..................... | B60L 53/00 |
| | | | | 701/22 |
| 2015/0353077 A1* | 12/2015 | Asami | ................... | B60W 10/06 |
| | | | | 701/22 |
| 2016/0097652 A1* | 4/2016 | Liu | .................... | G01C 21/3469 |
| | | | | 701/423 |
| 2016/0129803 A1* | 5/2016 | Grewal | .................. | B60L 50/16 |
| | | | | 701/22 |
| 2016/0304080 A1* | 10/2016 | Sugiyama | ............. | B60W 20/12 |
| 2018/0022210 A1* | 1/2018 | Matsumura | ........ | B60H 1/00771 |
| | | | | 123/41.05 |

\* cited by examiner $$W_{f1} V_{f1}^3 + W_{r1} V_{r1}^3 > W_{f2} V_{f2}^3 + W_{r2} V_{r2}^3$$

HYBRID ELECTRIC VEHICLE AND METHOD OF CONTROLLING A DRIVE MODE THEREFORE

Pursuant to 35 U.S.C. § 119(a), this application claims priority to Korean Application No. 10-2017-0144773, filed on Nov. 1, 2017, the contents of which are hereby incorporated by reference herein in their entirety.

BACKGROUND

Field

The present disclosure relates to a hybrid electric vehicle and method of controlling a drive mode therefore, and more particularly, to a hybrid electric vehicle and controlling method thereof. Although the present disclosure is suitable for a wide scope of applications, it is particularly suitable for switching a drive mode related to charge amount fluctuations of a battery using information of a route to a destination.

Discussion of the Related Art

A hybrid electric vehicle (HEV) means a vehicle that uses two types of power sources that include an engine and an electric motor. Since such an HEV has good fuel efficiency, excellent power performance, and advantageously reduced exhaust gas in comparison with a vehicle having an internal combustion engine only, many ongoing efforts are made to research and develop the HEV.

Such an HEV can operate in two types of drive modes depending on what kind of a power train is driven. One of the drive modes is an EV (electric vehicle) mode of drive with an electric motor only, and the other is an HEV (hybrid electric vehicle) mode of obtaining power by driving both an electric motor and an engine. The HEV performs a switching between the two modes depending on conditions while the HEV is running.

Aside from the drive mode classification according to the power train, particularly, in case of a plug-in HEV (PHEV), a drive mode can be classified into a CD (charge depleting) mode or a CS (charge sustaining) mode with reference to fluctuation of an SOC (state of charge) of a battery. Generally, a vehicle is run by activating an electric motor with power of a battery in CD mode. Power of an engine is mainly used in CS mode so as to prevent a battery SOC from getting further lowered.

A general PHEV is driven in CD mode irrespective of drive conditions such as a drive load, a presence or non-presence of charging possibility, a distance to a destination and the like, and then switches to a CS mode according to the SOC exhaustion. This is described with reference to FIG. 1.

FIG. 1 shows one example of a type of performing a mode switching of a general plug-in hybrid electric vehicle (PHEV).

In FIG. 1, a horizontal axis indicates a distance, a vertical axis of a top graph indicates a battery SOC (state of charge) of a PHEV, and a vertical axis of a bottom graph indicates a drive load.

Referring to the bottom graph in FIG. 1, intervals of downtown, freeway, and highway exist between an origin and a destination. There is a route that has a drive load reduced in order of freeway-highway-downtown. When a general PHEV is driven on such a route, it starts in CD mode without considering fluctuation of a drive load. If SOC is reduced below a preset reference, the PHEV performs a switching to a CS mode.

Yet, the CD mode has relatively advantageous efficiency in case of low-speed/low-load drive, whereas the CS mode has relatively advantageous efficiency in case of high-speed/high-load drive. Hence, as described above, if a mode switching is performed based on an SOC value only, since a drive load and energy efficiency properties of a hybrid power train are not considered, efficiency may be considerably lowered depending on a route. Such energy efficiency properties of the hybrid power train are described with reference to FIG. 2.

FIG. 2 is a diagram to describe power train energy efficiency property of a general HEV (hybrid electric vehicle).

In FIG. 2, a horizontal axis indicates an output (POWER) of a power train and a vertical axis indicates system efficiency of the power train.

Referring to FIG. 2, an EV mode drive using an electric motor is effective in a low output interval. Yet, after a point A at which efficiency of an EV mode and efficiency of an HEV mode cross with each other, an HEV mode drive is more effective. Moreover, an electric motor arrives at a maximum output point C earlier than an engine.

Hence, the point A may become a reference of engine maneuvering in CS mode and a point B at which efficiency of the HEV mode becomes maximum can become a reference of engine maneuvering in CD mode.

To improve the above efficiency problem, an adaptive mode switching (adaptive CD/CS) scheme can be considered. The adaptive mode switching scheme is a control scheme of automatically switching a CD/CS mode according to optimal efficiency using a DUC (distance until charge), an EV mode DTE (drive to empty), a drive condition and the like in case of travelling a long distance longer than an AER (all electric range) drivable with an electric motor only.

For example, in case of applying an adaptive mode switching scheme, a vehicle is driven in CS mode if a current drive load is equal to or greater than a predetermined value on the basis of a drive condition. If the drive load is low, the vehicle can be driven in CD mode. Of course, if DUC≤DTE even in a heavy drive load interval, the vehicle can be guided to exhaust SOC in DUC by exhausting SOC with CD drive. Such an adaptive mode switching scheme is described with reference to FIG. 3.

FIG. 3 shows one example of a type of performing a mode switching in case of applying an adaptive mode switching scheme in a general plug-in hybrid electric vehicle (PHEV). Assume that the meanings of horizontal and vertical axes and route configuration in FIG. 3 are the same as shown in FIG. 1.

Referring to FIG. 3, an initial drive starts in CD mode. Yet, when an interval (here, freeway) over a preset drive load is entered, although SOC is equal to or greater than a predetermined value, the CD mode is switched to a CS mode and then switched to the CD mode again in an interval (DUC≤DTE), whereby an efficient drive is possible.

Meanwhile, a vehicle's fuel efficiency is directly related to a drive load. Air resistance can be taken as one of the drive load. Air resistance is proportional to a square of speed and an air resistance coefficient. Since the speed reflects a driver's will, a scheme of lowering the air resistance coefficient is considered first to reduce the air resistance. As one of such scheme, an eco-friendly vehicle such as a HEV has an active air flap (AAF), which is flap capable of being open/closed, installed between a radiator grill and a radiator. The active air flap installed vehicle can reduce the air resistance by closing the flap while driven fast. If an internal temperature of an engine room increases, the vehicle can cool down the engine room normally by opening the flap.

However, the general adaptive mode switching scheme fails to consider maneuvering the active air flap associated with the air resistance despite considering a drive load and SOC in per-mode drive interval configuration.

SUMMARY

Accordingly, the present disclosure is directed to a hybrid electric vehicle and method of controlling a drive mode therefore that substantially obviates one or more problems due to limitations and disadvantages of the related art.

An object of the disclosure is to provide a method of performing a mode switching control more efficiently and hybrid electric vehicle for the same.

Particularly, the disclosure provides a method of efficiently switching a drive mode and vehicle for the same, by which maneuvering of an active air flap of an eco-friendly vehicle can be taken into consideration.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling a mode switching of a hybrid electric vehicle having an air resistance coefficient changing means according to an engine maneuvering situation according to one embodiment of the present disclosure may include dividing a drive route into a plurality of intervals and operating a per-interval drive load for each of a plurality of the intervals, determining a reference drive load becoming a reference of change into a second drive mode from a first drive mode according to fluctuation of a charge state of a battery using the operated per-interval drive load, and setting an interval corresponding to the reference drive load among a plurality of the intervals as a first drive mode drive interval or a drive interval having the first drive mode and the second drive mode coexist therein. Here, the setting may be performed by considering a speed of the interval corresponding to the reference drive load and a speed of a next interval on the drive route.

In another aspect, as embodied and broadly described herein, a hybrid electric vehicle having an air resistance coefficient changing means according to an engine maneuvering situation according to one embodiment may include a first control unit obtaining information on a drive route and a second control unit configured to divide a drive route into a plurality of intervals, operate a per-interval drive load for each of a plurality of the intervals, determine a reference drive load becoming a reference of change into a second drive mode from a first drive mode according to fluctuation of a charge state of a battery using the operated per-interval drive load, and set an interval corresponding to the reference drive load among a plurality of the intervals as a first drive mode drive interval or a drive interval having the first drive mode and the second drive mode coexist therein, wherein the second control unit performs the setting by considering a speed of the interval corresponding to the reference drive load and a speed of a next interval on the drive route.

Accordingly, the present disclosure provides the following effects/advantages.

First of all, the above-configured hybrid electric vehicle (HEV) related to at least one embodiment can perform a mode switching control more efficiently.

Particularly, since an adaptive mode switching is performed to enable an active air flap to be open in a relatively low-speed interval, air resistance due to the open active air flap can be minimized.

Effects obtainable from the present disclosure may be non-limited by the above mentioned effect. And, other unmentioned effects can be clearly understood from the following description by those having ordinary skill in the technical field to which the present disclosure pertains.

It is to be understood that both the foregoing general description and the following detailed description are exemplary and explanatory and are intended to provide further explanation of the claims.

BRIEF DESCRIPTION OF THE DRAWINGS

Exemplary aspects are illustrated in the drawings. It is intended that the embodiments and figures disclosed herein are to be considered illustrative rather than restrictive.

DETAILED DESCRIPTION

In the following detailed description, reference is made to the accompanying drawing figures which form a part hereof, and which show by way of illustration specific embodiments of the disclosure. It is to be understood by those of ordinary skill in this technological field that other embodiments may be utilized, and structural, electrical, as well as procedural changes may be made without departing from the scope of the present disclosure. Wherever possible, the same reference numbers will be used throughout the drawings to refer to the same or similar parts.

In the whole specification, if a prescribed part 'comprises or includes' a prescribed component, this means that other components can be further included instead of excluding them unless a presence of specially opposed description. Moreover, the same reference numbers will be used throughout the whole specification to refer to the same parts.

Prior to describing a mode switching method according to an embodiment of the present disclosure, a structure of an eco-friendly vehicle to which embodiments of the present invention are applicable is described with reference to FIG. 4 and FIG. 5.

Figure 4:
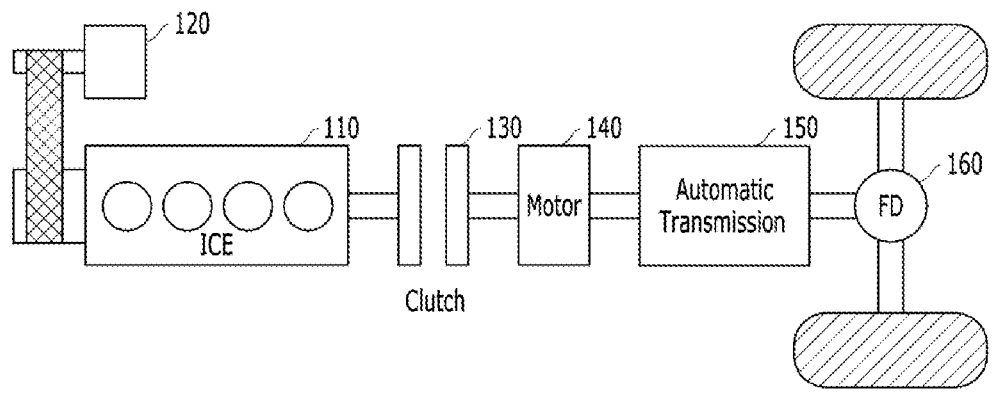
FIG. 4 shows one example of a power train structure of a hybrid electric vehicle in accordance with an embodiment of the present disclosure.

FIG. 4 shows one example of a power train structure of a hybrid electric vehicle in accordance with an embodiment.

Referring to FIG. 4, illustrated is a power train of a hybrid electric vehicle (HEV) employing a parallel type hybrid system having an electric motor (or a drive motor) 140 and an engine clutch 130 installed between an internal combustion engine (ICE) 110 and a transmission 150.

In such a vehicle, if a driver steps on an accelerator after engine start in general, the motor 140 is driven using a power of a battery while the engine clutch 130 is open. Subsequently, wheels are provided with power of the motor through the transmission 150 and a final drive (FD) 160 so as to move (i.e., EV mode). As the vehicle is gradually accelerated so as to need greater driving power, an auxiliary motor or a start generation motor 120 operates to drive the engine 110.

Accordingly, if rotation speeds of the engine 110 and the motor 140 become equal to each other, the engine clutch 130 engages so that both of the engine 110 and the motor 140 or the engine 110 only can drive the vehicle (i.e., transition to HEV mode from EV mode). If a preset engine-off condition (e.g., vehicle deceleration, etc.) is met, the engine clutch 130 is opened and the engine 110 stopes (i.e., transition to EV mode from HEV mode). Moreover, an HEV can change a battery by converting a drive power of wheels on braking into electric energy, which is called braking energy regeneration or regeneration braking.

Since the start generation motor 120 plays a role as a start motor on starting an engine and also plays a role as a generator after engine start or rotation energy recovery of an engine on start-off, the start generation motor 120 may be referred to as 'hybrid start generator (HSG)' or 'auxiliary motor' in some cases.

Figure 5:
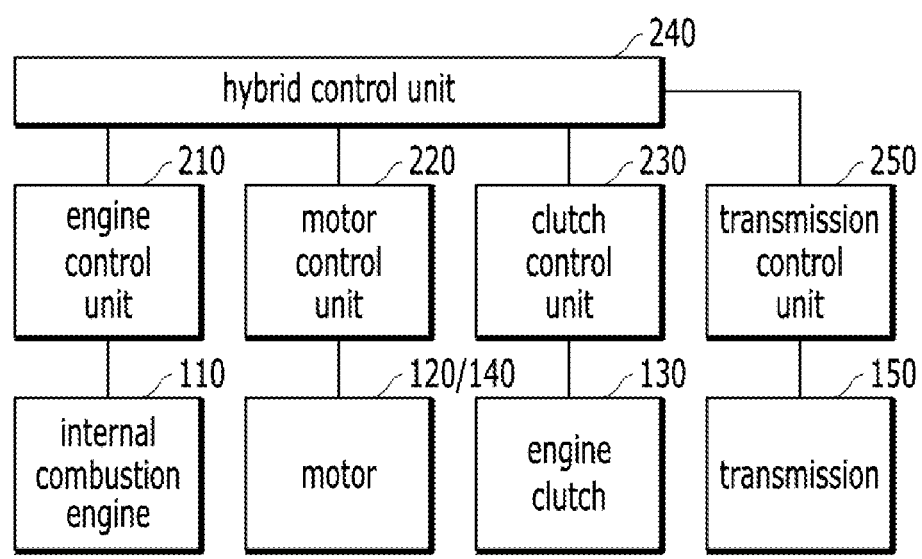
FIG. 5 is a block diagram showing one example of a control system of a hybrid electric vehicle in accordance with an embodiment.

Interrelation between control units in a vehicle having the aforementioned power train applied thereto is shown in FIG. 5.

FIG. 5 is a block diagram showing one example of a control system of a hybrid electric vehicle.

Referring to FIG. 5, in an HEV, an internal combustion engine 110 may be controlled by an engine control unit 210, torques of a start generation motor 120 and an electric motor 140 may be controlled by a motor control unit (MCU) 220, and an engine clutch 130 may be controller by a clutch control unit 230. Here, the engine control unit 210 may be called an engine management system (EMS). A transmission 150 is controlled by a transmission control unit 250. In some cases, a control unit of the start generation motor 120 and a control unit of an electric motor 140 may be provided separately.

Each of the control units is connected to a hybrid control unit (HCU) 240 as a superordinate control unit that controls an overall mode switching process, and is able to provide information required for a drive mode change, an engine clutch control on gear shift and/or information required for an engine stop control to the HCU 240 under the control of the HCU 240 or perform an operation according to a control signal.

Particularly, the HCU 240 determines whether to switch a mode according to an operation state of the vehicle. For example, the HCU 240 determines an open timing of the engine clutch 130 and performs a hydraulic control (in case of a wet EC) or a torque capacity control (in case of a dry EC) on opening the engine clutch 130. The HCU 240 determines a state (e.g., lock-up, slip, open, etc.) of EC and is able to control a fuel injection stop timing. The HCU 240 is able to control engine rotation energy recovery by delivering a torque command for controlling the torque of the start generation motor 120 for the engine stop control to the motor control unit 220. Moreover, the HCU 240 can control a subordinate control unit for determining a mode switching condition and switching a mode in case of an adaptive mode switching control according to an embodiment.

Of course, the aforementioned interrelation between control units and functions/classification of the control units are exemplary and are non-limited by their terms, which is obvious to those skilled in the art. For example, the HCU 240 can be implemented to be provided in a manner of replacing a corresponding function by one of other control units except itself, or in a manner of distributing a corresponding to two or more of other control units.

Based on the aforementioned vehicle structure, a more efficient mode switching control method according to one embodiment is described as follows.

First of all, the opening of an active air flap (AAF) is basically and deeply related to an engine temperature, i.e., a cooling water temperature. For example, if a cooling water temperature becomes equal to or higher than a preset first temperature, the AAF is open to enable smooth air cooling of an engine room. If the cooling water temperature becomes equal to or lower than a preset second temperature, it is able to control the AAF to be closed again for air resistance reduction. Eventually, since a case that the AAF is open in the adaptive mode switching control process has a precondition set as the rise of the cooling water temperature, it may be after performing an engine start in CS mode. If so, an open environment of the AAF changes depending on where a CS mode drive interval is disposed in a drive interval in the adaptive mode switching control process. The effect of the AAF opening according to a disposition change of a CS mode drive interval is described with reference to FIGS. 6 to 8 as follows.

Figure 6:
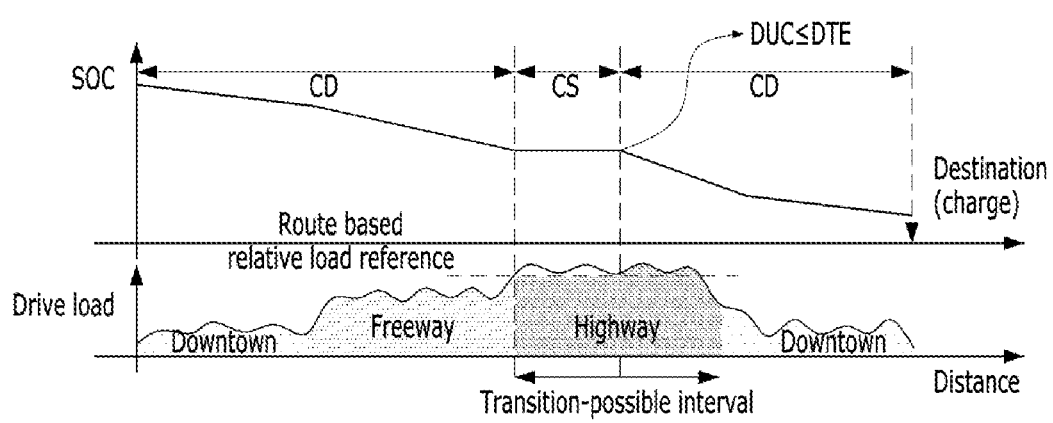
FIG. 6 is a diagram to describe an interval in which a CS mode drive interval can be disposed.

FIG. 6 is a diagram to describe an interval in which a CS mode drive interval can be disposed.

Referring to FIG. 6, a downtown, a highway, a freeway and a downtown are located in order on a drive route and a drive load corresponds to a bottom graph. Here, in case that a general route based adaptive mode changing method is applied, as shown in FIG. 6, if a drive load reaches a relative load reference, a change into a CS mode is performed. Yet, it is not mandatory to make transition to a CS mode as soon as a relative load reference is reached. If a drive load condition is just met, a CS mode drive interval can be set different from a top graph within 'transition-possible interval'. Yet, as described above, if a CS mode drive interval starts, the AAF will be controlled to be open due to a cooling water temperature rise according to engine maneuvering. Hence, it is necessary to check whether setting a CS mode drive interval somewhere within 'transition-possible interval' is advantageous for the AAF opening.

Figure 7:
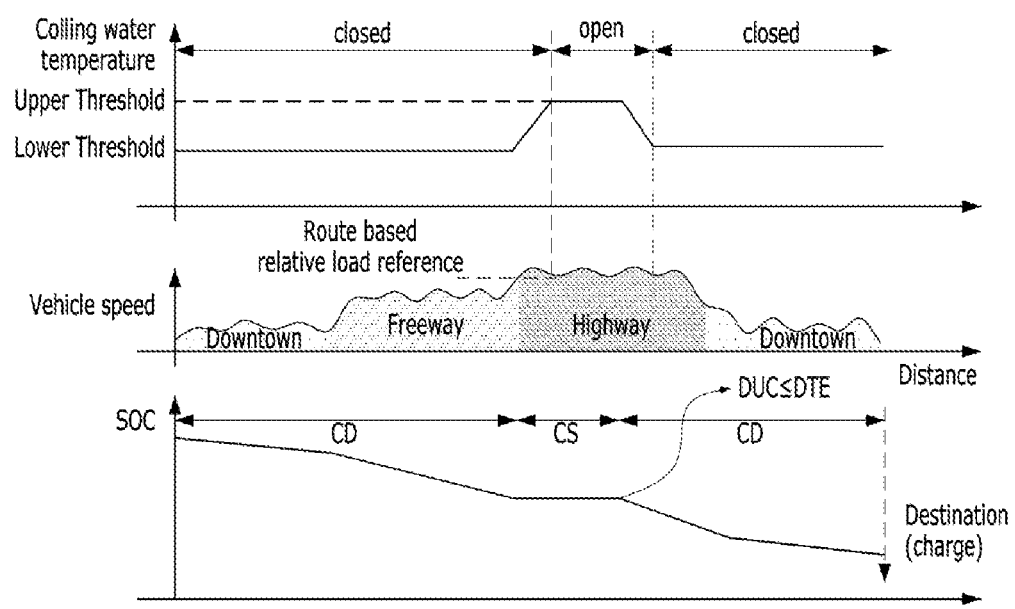
FIG. 7 shows one example of a situation that a CS mode drive interval is disposed in a relatively high speed region.
Figure 8:
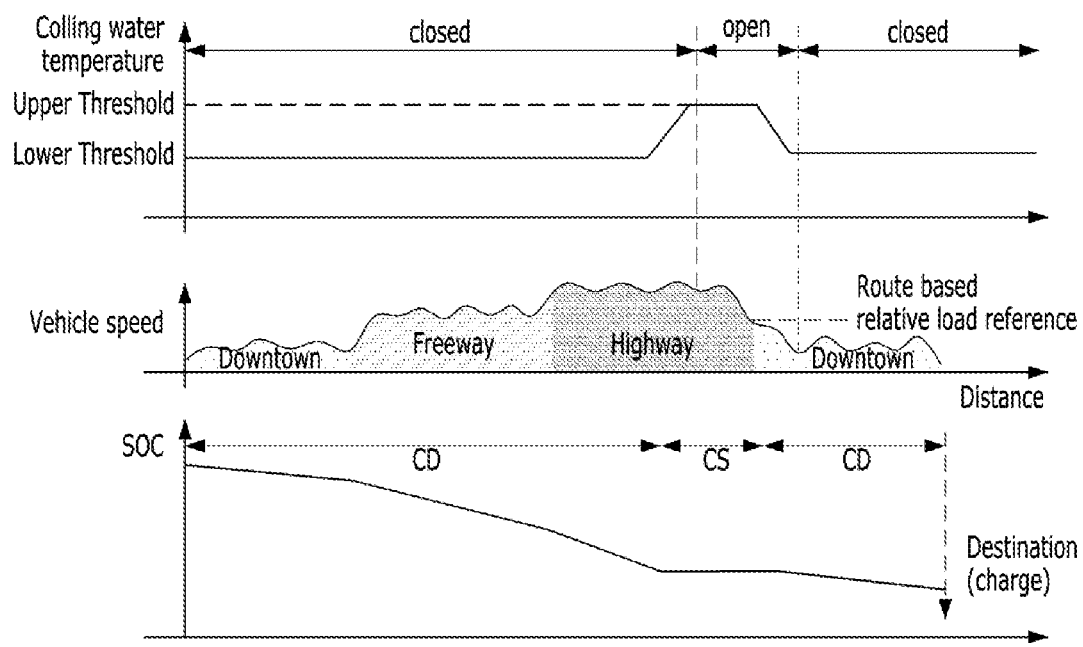
FIG. 8 shows one example of a situation that a CS mode drive interval is disposed in a relatively low speed region.

FIG. 7 shows one example of a situation that a CS mode drive interval is disposed in a relatively high speed region. FIG. 8 shows one example of a situation that a CS mode drive interval is disposed in a relatively low speed region.

In FIG. 7 and FIG. 8, the transition-possible interval described in FIG. 6 is identically applied in common, and a drive load is assumed as proportional to a vehicle speed. In FIG. 7, a CS mode drive interval is assumed as disposed on a first half having a relatively high vehicle speed in a transition-possible interval. In FIG. 8, a CS mode drive interval is assumed as disposed on a second half having a relatively low vehicle speed in a transition-possible interval.

Referring to FIG. 7, a CS mode switching is performed immediately after a freeway has been entered. After the CS mode switching, AAF is opened at high speed due to a cooling water temperature rise. On the other hand, a vehicle speed in an interval for opening the AAF in FIG. 8 is relatively lower than that in FIG. 7. As described above, since air resistance is proportional to a square of speed and an air resistance coefficient, the rise of the air resistance coefficient due to the opening of AAF at high speed causes air resistance greater than that due to the opening of AAF at low speed.

Eventually, since the AAF is preferably open in a low speed interval, if the opening of the AAF is taken into consideration, it is observed that a CS interval is preferably assigned to a low speed interval even in a transition-possible interval.

Therefore, according to one embodiment, it is proposed to operate a load of a drive route, determine a transition-possible interval according to the load operation, and dispose a CS mode drive interval at a point where an air resistance rise according to AAF opening is minimized within the transition-possible interval.

A CS mode drive interval selecting process according to the present embodiment is described with reference to FIGS. 9 to 13 as follows. In the following description, destination information through a preset method (e.g., a case of being recognized as a frequently driven route, a case of inputting a destination through navigation, etc.) and route information (e.g., information required for calculating a drive load) according to the destination information are assumed as already obtained in a vehicle, and a situation that an adaptive drive mode switching control according to the present embodiment is activated is also assumed.

Figure 9:
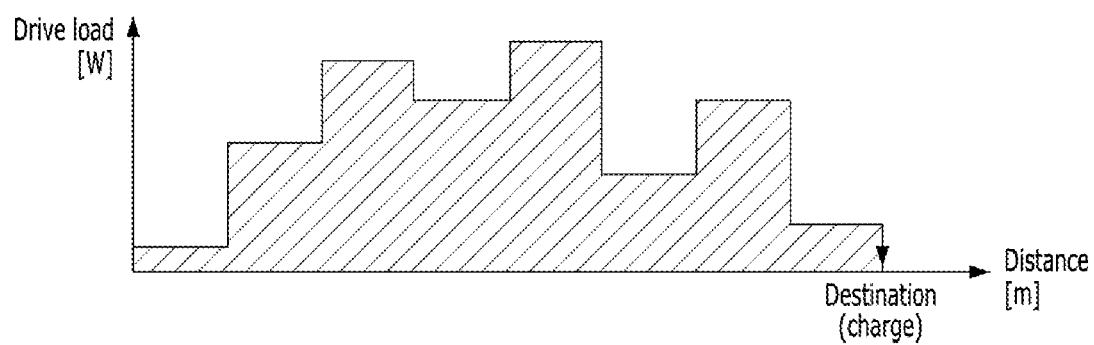
FIG. 9 shows one example of a drive load operation result of a drive interval in accordance with an embodiment.

FIG. 9 shows one example of a drive load operation result of a drive interval according to one embodiment.

Referring to FIG. 9, a vehicle (e.g., a hybrid control unit) can divide a drive route into a plurality of intervals according to a prescribed reference and calculate a drive load per interval. Hence, in FIG. 9, there are 8 intervals to a destination and a drive load per interval is shown. Here, the operation of the drive load can be performed by Equation 1.

$$F_{load} = ma + F_{aero} + F_{R.R.} + mg \sin\theta \quad \text{[Equation 1]}$$

In Equation 1, $F_{load}$ indicates a drive load, ma indicates a multiplication of a vehicle weight and acceleration, $F_{aero}$ indicates air resistance, $F_{R.R.}$ indicates drive resistance due to tire's rolling resistance and the like, and mg sin θ indicates resistance due to inclination. Here, the air resistance can be expressed as Equation 2.

$$F_{aero} = \frac{1}{2} \rho C_d A_f (V_x + V_{wind})^2 \quad \text{[Equation 2]}$$

In Equation 2, ρ indicates air density, $C_d$ indicates an air resistance coefficient, $V_x$ indicates a vehicle velocity, $V_{wind}$ indicates wind velocity, and $A_f$ indicates a front size of a vehicle.

In Equation 1 and Equation 2, since each value is a fixed value according to a vehicle or a numerical value inferable/calculable directly or indirectly as information related to a route, description of a detailed obtaining method shall be omitted. Moreover, since formulas of Equation 1 and Equation 2 described as a drive load operating method are exemplary, it is apparent to those skilled in the art that various drive load operating methods exist. Hence, it is not mandatory for an operation of a drive load to follow Equation 1 and Equation 2.

Figure 10:
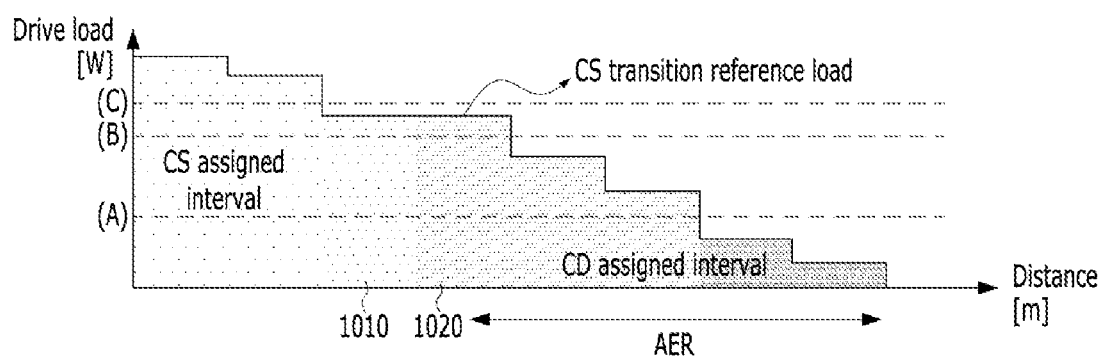
FIG. 10 shows one example of a result from rearranging a drive interval in accordance with an embodiment.

If the interval partition and the per-interval drive load operation are completed, each interval can be rearranged like FIG. 10 according to a preset reference.

Figure 1:
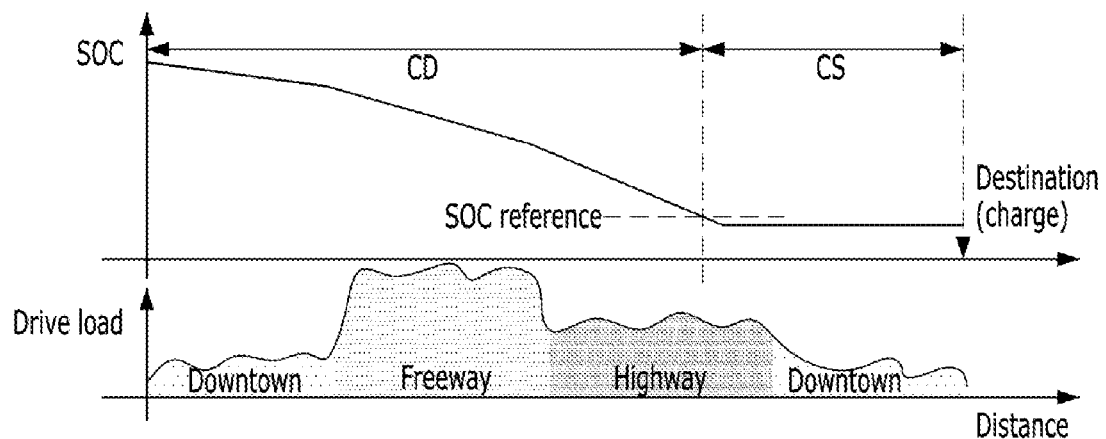
FIG. 1 shows one example of a type of performing a mode switching of a general plug-in hybrid electric vehicle (PHEV)
Figure 2:
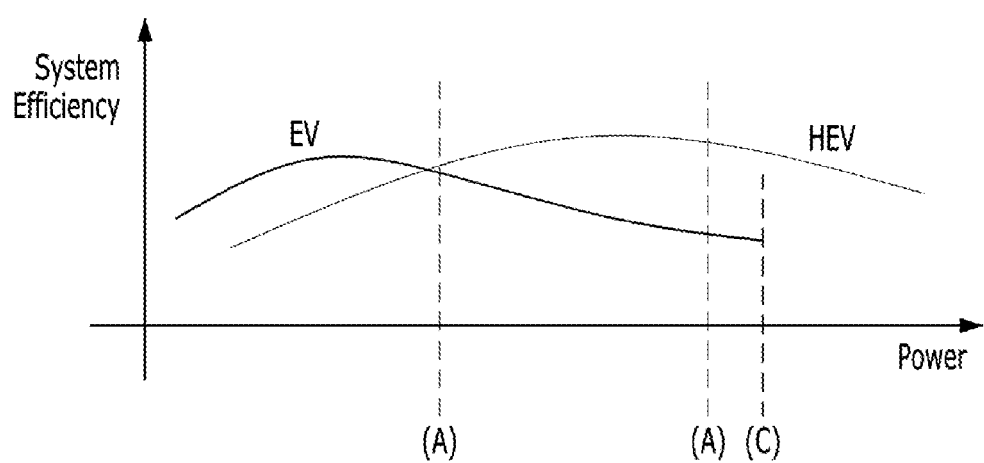
FIG. 2 is a diagram to describe power train energy efficiency property of a general HEV (hybrid electric vehicle)
Figure 3:
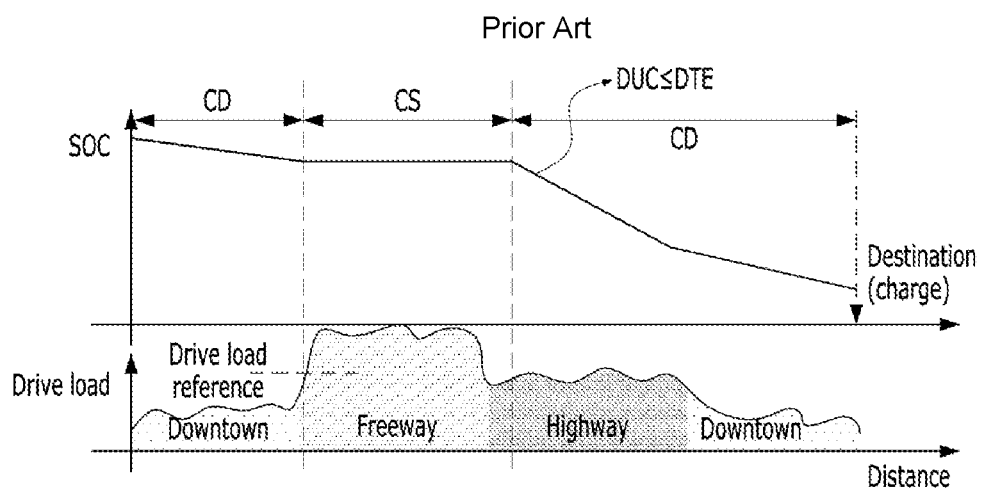
FIG. 3 shows one example of a type of performing a mode switching in case of applying an adaptive mode switching scheme in a general plug-in hybrid electric vehicle (PHEV)

FIG. 10 shows one example of a result from rearranging a drive interval according to one embodiment. Although a reference for rearranging intervals may consider both of the drive efficiency of per-vehicle power train and the SOC, as shown in FIG. 2, a per-interval drive load is assumed as an arrangement reference for clarity of the following description.

Referring to FIG. 10, AER can be calculated in a manner of subtracting a drive load from SOC by starting with a lowest drive load interval. In this case, a drive load corresponding to an interval including a point at which the SOC is 0 or a preset minimum value (i.e., a value resulting from subtracting a maximum value of energy usable for a CD drive from the SOC) becomes a CS mode transition reference.

Eventually, an interval completely included in AER from a most right side of a graph becomes an interval for a drive in CD mode and 2 intervals of a most left side become an interval for a drive in CS mode. Yet, in case that there are 2 intervals 1010 and 1020 corresponding to a CS mode transition reference like FIG. 10, one of the 2 intervals becomes an interval for a drive in CS mode only and the other becomes an interval in which a CS mode drive and a CS mode drive coexist. Hence, how to assign the drive modes of the 2 intervals 1010 and 1020 for an efficient drive becomes a problem.

Figure 11:
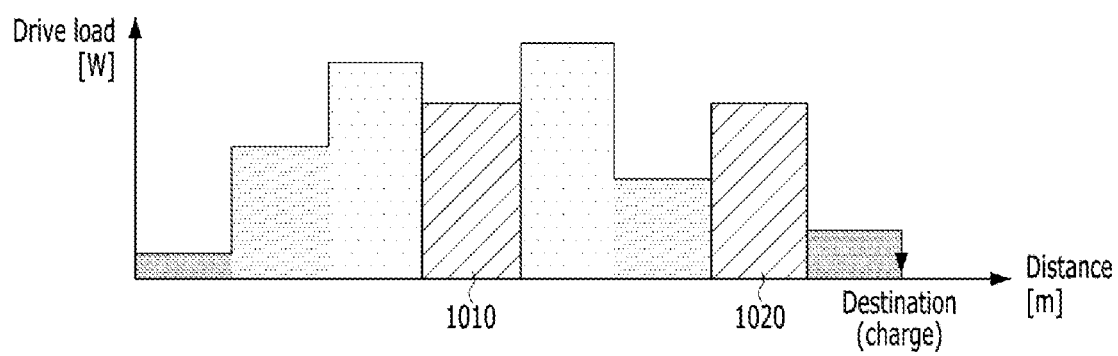
FIG. 11 shows one example of a result from rearranging the interval disposition of FIG. 10 in order of a drive route.

After an interval corresponding to a CS transition reference load has been determined through the process shown in FIG. 10, a result from rearranging the interval in order of a drive route again is shown in FIG. 11.

FIG. 11 shows one example of a result from rearranging the interval disposition of FIG. 10 in order of a drive route. Namely, as shown in FIG. 11, one of 2 intervals 1010 and 1020 becomes a CS mode drive interval and the other becomes a drive interval in which CS mode and CD mode coexist. Before and after the former interval 1010, a drive load is heavier than the corresponding interval 1010. Before and after the latter interval 1020, a drive load is lighter than the corresponding interval 1020. The reference principle for interval assignment for this case is described with reference to FIG. 12.

Figure 12:
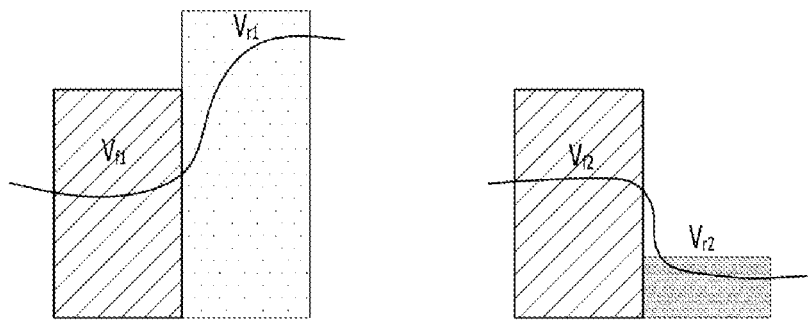
FIG. 12 is a diagram to describe one example of an interval assignment reference in consideration of AAF opening in accordance with an embodiment.

FIG. 12 is a diagram to describe one example of an interval assignment reference in consideration of AAF opening according to one embodiment.

It should be considered that AAF is not immediately open even in a CS interval, as shown in FIG. 7 and FIG. 8. Namely, according to an operation reference of AAF, if a cooling water temperature in a CS interval is also lower than an opening reference temperature, the AAF is closed for that duration. If the cooling water temperature is not lowered to an AAF closing reference temperature in a CD interval as well, the AAF is in open state. Hence, a part possibly affecting a drive load through the AAF according to CD/CS mode transition includes an interval in which CS mode and CD mode coexist and an interval next to the interval in which the CS mode and the CD mode coexist. A single block in FIG. 12 means a drive load (power: W). Since a drive load is generally proportional to a vehicle velocity but is affected by inclination and the like, a vehicle velocity profile should be considered in order to compare energy used by air resistance.

As described in Equation 2, since air resistance is proportional to the square of velocity, energy consumed to overcome the air resistance is proportional to the cube of velocity.

Namely, if energy consumed to overcome the air resistance is referred to as "$E_{aero}$", $E_{aero}$ becomes an integral of $F_{aero}$ [$E_{aero}=\int F_{aero} ds$]. This is expressed as "$\int F_{aero} V dt$" as well. Hence, it can be observed that $E_{aero}$ is proportional to the cube of velocity. Eventually, if the remaining factor is substituted with k, it may result in "$E_{aero}=kV^3$", where k includes a time t required for cooling down a cooling water and an air resistance coefficient $C_d$. In this case, since the time t required for the cooling may ignore the influence of velocity, it can be summarized into "$k=C_d*W$". Here, W is a constant containing t in k by excluding influence of $C_d$ and can be obtained through a per-vehicle test. The reason for ignoring the influence of velocity is described as follows. First of all, when a heat transfer amount is referred to as Q, it is "$Q=cm\Delta T$" (c: relative specific heat between engine cooling water and external air flowing to a radiator grill, m: effective mass between two heat-transferring objects, $\Delta T$: a temperature difference between engine cooling water and external air flowing to a radiator grill). If a vehicle speed is very low, a temperature of external air flowing to the radiator grill is increased by an engine cooling water temperature. Hence, as $\Delta T$ is reduced, the time t required for the cooling may vary. Yet, if a vehicle speed becomes equal to or higher than a predetermined velocity, as external air flowing to the radiator grill continues to be replaced, a temperature of the external air cannot rise enough to give influence. Therefore, the influence of velocity can be ignored.

In aspect of energy consumption, energy comparison between a case that a velocity increasing interval after a corresponding interval is coming like a left part of FIG. 12 and a case that a velocity decreasing interval after a corresponding interval is coming can be performed as follows.

Total consumed energy in the left and right cases of FIG. 12 becomes a sum of consumed energy ($k_f V_f^3$) of a front interval and consumed energy ($k_r V_r^3$) of a rear interval. If an air resistance coefficient is subtracted from $k_f$, total energy can be expressed as "$C_d(W_f V_f^3+W_r V_r^3)$". Here, each of $V_f$ and $V_r$ indicates an average velocity of a CD/CS mode coexisting interval and a corresponding rear interval and each of $V_f$ and $V_r$ can be corrected into $V+V_{wind}$ in consideration of wind effect.

Meanwhile, an air resistance coefficient in an open state of AAF is greater than that in a closed state of AAF (i.e., $C_d$/open>$C_d$/close). If consumed energy "$W_{f1}V_{f1}^3+W_{r1}V_{r1}^3$" of the left case of FIG. 12 is greater than consumed energy "$W_{f2}V_{f2}^3+W_{r2}V_{r2}^3$" of the right case (i.e., $W_{f1}V_{f1}^3+W_{r1}V_{r1}^3>W_{f2}V_{f2}^3+W_{r2}V_{r2}^3$), it is "$C_d$/open $(W_{f1}V_{f1}^3+W_{r1}V_{r1}^3)+C_d$/close$(W_{f2}V_{f2}^3+W_{r2}V_{r2}^3)>C_d$/close $(W_{f1}V_{f1}^3+W_{r1}V_{r1}^3)+C_d$/open$(W_{f2}V_{f2}^3+W_{r2}V_{r2}^3)$". Hence, it can be concluded that energy consumption is small in case of assigning a CS mode to a region where $W_f V_f^3+W_r V_r^3$ is small. A corresponding interval assignment result is shown in FIG. 13.

Figure 13:
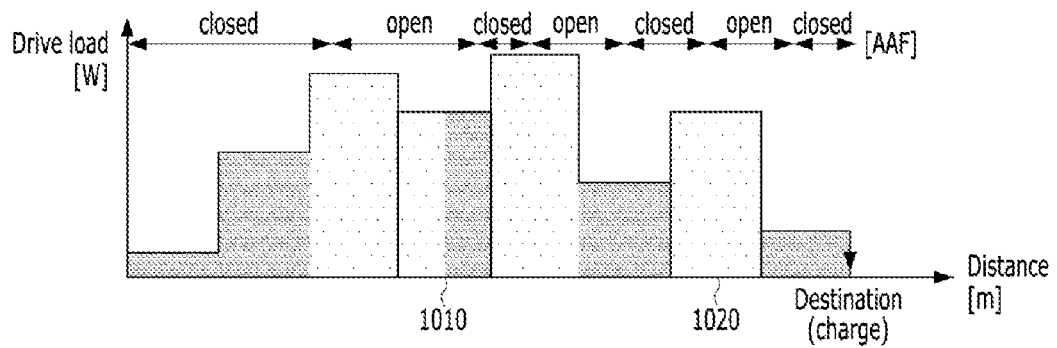
FIG. 13 shows one example of a result from configuring a drive interval in accordance with an embodiment.

FIG. 13 shows one example of a result from configuring a drive interval according to one embodiment.

Referring to FIG. 13, according to the aforementioned selecting method, when there are two intervals 1010 and 1020, the front interval 1010 is changed into a CD interval in CS mode, i.e., the front interval 1010 is determined as an interval where two modes coexist. And, the rear interval 1020 is determined as a CS mode drive interval.

Figure 14:
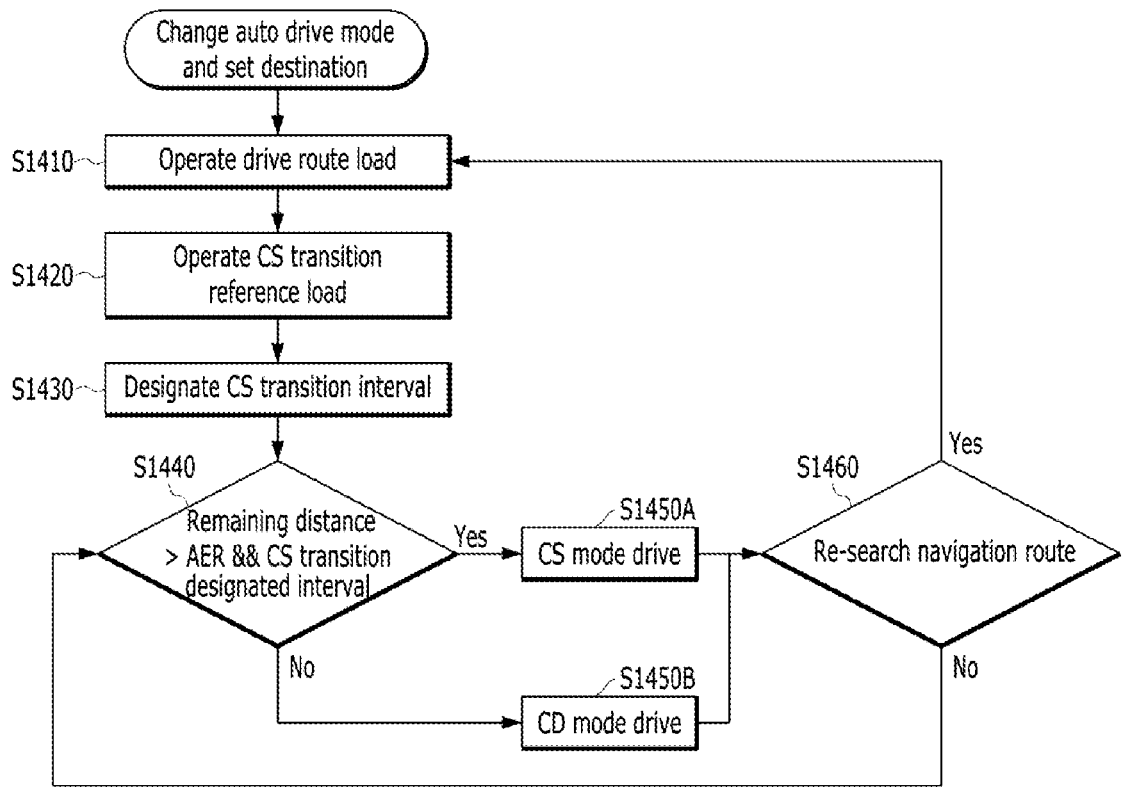
FIG. 14 is a flowchart for one example of a mode switching control process in accordance with an embodiment.

The above-mentioned process is summarized into a flowchart shown in FIG. 14.

FIG. 14 is a flowchart for one example of a mode switching control process according to one embodiment. Since details of each step in FIG. 14 can refer to the description with reference to FIGS. 9 to 13, redundant description shall be omitted for clarity of the specification.

Referring to FIG. 14, if an AAF considered adaptive drive mode change (AUTO drive mode change) control according to the present embodiment and a destination are configured, a drive route load can be operated [S1410]. In doing so, as described above, the drive route load can be operated for each of a plurality of intervals.

Once the drive route load is operated, a load, which becomes a reference of transition to a CS mode can be determined [S1420]. A reference load determining method is the same as described with reference to FIG. 10.

Once the reference load is determined, an interval for driving in CS mode and an interval for driving in CD mode can be determined. In case that there are two intervals corresponding to the reference load, one of the two intervals is determined as an interval having two modes coexist therein (i.e., CS mode transition interval) and the other is determined as a CS mode drive interval, by the method described with reference to FIG. 12 [S1430].

If the interval determination is complete, a drive mode transition according to the determined per-interval drive mode is performed. In the CS mode transition interval, a remaining distance and an AER are compared with each other [S1440]. A CS mode drive is performed in an interval where the remaining distance is greater [S1450A]. Or, in an interval where the remaining distance is not greater, a CD mode drive is performed [S1450B]. Such a process can be repeatedly performed by going back to the step S1410 or S1440, depending on whether a destination or a drive route is changed in the course of driving like navigation route re-search and the like [S1460].

In the above description, a main agent of determination of each step may include a single control unit or two or more control units. For example, the drive load operating step S1410 may be performed in a manner of performing the step S1410 by an AVN (audio/video/navigation) system and then forwarding a corresponding result to a hybrid control unit. Or, after the hybrid control unit has received information (e.g., inclination angle, congestion, road type, length, inclination, vehicle speed variation, current location, etc.) for performing the corresponding step from the AVN system including a GPS module, it may be able to perform the rest of the steps such as operation/determination and the like.

Thus, the embodiments of the present disclosure can be summarized as follows. When a hybrid electric vehicle including a device for varying air resistance of a vehicle depending on whether an engine needs to be cooled down, an engine and a power source other than the engine is in a situation that the engine cooling is not necessary during driving, an engine maneuvering interval is determined through an operation of a drive route load and an operation of an engine maneuvering reference power. As the engine cooling is avoided in a high air resistance area, fuel efficiency can be improved.

Moreover, although the above description is made by referring to a situation that an air resistance coefficient is fluctuated by an AAF, such description is just exemplary. Thus, it is apparent to those skilled in the art that the embodiment of the present is applicable to any devices or means capable of changing an air resistance coefficient according not to the AAF but to a drive mode.

The aforementioned disclosure can be implemented in a program recorded medium as computer-readable codes. The computer-readable media include all kinds of recording devices in which data readable by a computer are saved. The computer-readable media include ROM, RAM, CD-ROM, magnetic tapes, floppy discs, optical data storage devices, and the like for example and also include carrier-wave type implementations (e.g., transmission via Internet).

While a number of exemplary aspects have been discussed above, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

What is claimed is:

1. A method of controlling a mode switching of a hybrid electric vehicle having an air resistance coefficient changing means according to an engine maneuvering situation, the method, comprising:
   dividing a drive route into a plurality of intervals and calculating a per-interval drive load for each of the plurality of the intervals;
   determining a reference drive load corresponding to a reference of change from a first drive mode into a second drive mode according to a charge state of a battery using the calculated per-interval drive load; and
   setting an interval corresponding to the reference drive load among a plurality of the intervals as a first drive mode drive interval or a drive interval having the first drive mode and the second drive mode coexist therein,
   wherein the setting is performed by considering a speed of the interval corresponding to the reference drive load and a speed of a next interval on the drive route;
   wherein the air resistance coefficient changing means comprises an active air flap (AAF);
   wherein when there are two intervals corresponding to the reference drive load among a plurality of the intervals, the step of setting comprises:
   setting one of the two intervals as the first drive mode drive interval; and
   setting the remaining one of the two intervals as the drive interval having the first drive mode and the second drive mode coexist therein; and
   wherein the setting step further comprises:
   calculating a first sum of a value resulting from multiplying a cube of a corresponding interval velocity by a preset first constant and calculating a second sum of a value resulting from multiplying a cube of a next interval velocity of a corresponding interval on the drive route by a preset second constant for each of the two intervals; and
   comparing the first sum with the second sum for each of the two intervals,
   wherein the setting as the first drive mode drive interval is performed by setting the interval having a smaller calculated sum among the first sum and the second sum as the first drive mode drive interval as a result of the comparison.

2. The method of claim 1, wherein the hybrid electric vehicle has a first air resistance coefficient when cooling of an engine is necessary and a second air resistance coefficient when the cooling of the engine is not necessary according to an operation of the air resistance coefficient changing means, and wherein the preset first constant and the preset second constant include the first air resistance coefficient and the second air resistance coefficient, respectively.

3. The method of claim 1, further comprising, when the drive interval having the first drive mode and the second drive mode coexist therein is entered, comparing a remaining distance to a destination of the drive route with a drive-possible distance in the second drive mode.

4. The method of claim 3, further comprising:
   when the remaining distance is greater as a result of the comparison, driving in the first device mode; and
   when the drive-possible distance is greater as the result of the comparison, driving in the second device mode.

5. The method of claim 1, wherein the first drive mode comprises a charge sustaining (CS) mode and wherein second drive mode comprises a charge depletion (CD) mode.

6. A non-transitory computer-readable recording medium in which a program for executing a method of controlling a mode switching of a hybrid electric vehicle according to one of claim 1 is recorded.

7. A hybrid electric vehicle, having an air resistance coefficient changing means according to an engine maneuvering situation, the hybrid electric vehicle, comprising:
   a first control unit configured to obtain information on a drive route; and
   a second control unit configured to divide a drive route into a plurality of intervals, calculate a per-interval drive load for each of a plurality of the intervals, determine a reference drive load corresponding to a reference of change from a first drive mode into a second drive mode according to a charge state of a battery using the calculated per-interval drive load, and set an interval corresponding to the reference drive load among a plurality of the intervals as a first drive mode drive interval or a drive interval having the first drive mode and the second drive mode coexist therein,
   wherein the second control unit performs the setting the interval by considering a speed of the interval corresponding to the reference drive load and a speed of a next interval on the drive route;
   wherein the air resistance coefficient changing means comprises an active air flap (AAF);
   wherein when there are two intervals corresponding to the reference drive load among a plurality of the intervals, the second control unit is configured to set one of the two intervals as the first drive mode drive interval and to set the remaining one of the two intervals as the drive interval having the first drive mode and the second drive mode coexist therein; and wherein the second control unit calculates a first sum of a value resulting from multiplying a cube of a corresponding interval velocity by a preset first constant and second sum of a value resulting from multiplying a cube of a next interval velocity of a corresponding interval on the drive route by a preset second constant for each of the two intervals, compares the first sum with the second sum for each of the two intervals, and sets the interval having a smaller calculated sum among the first sum and the second sum as the first drive mode drive interval as a result of the comparison.

8. The hybrid electric vehicle of claim 7, wherein the hybrid electric vehicle has a first air resistance coefficient when cooling of an engine is necessary and a second air resistance coefficient when the cooling of the engine is not necessary according to an operation of the air resistance coefficient changing means, and wherein the preset first constant and the preset second constant include the first air resistance coefficient and the second air resistance coefficient, respectively.

9. The hybrid electric vehicle of claim 7, wherein when the drive interval having the first drive mode and the second drive mode coexist therein is entered, the second control unit compares a remaining distance to a destination of the drive route with a drive-possible distance in the second drive mode.

10. The hybrid electric vehicle of claim 9, wherein when the remaining distance is greater as a result of the comparison, the second control unit controls driving to be performed in the first device mode and wherein when the drive-possible distance is greater as the result of the comparison, the second control unit control the driving to be performed in the second device mode.

11. The hybrid electric vehicle of claim 7, wherein the first drive mode comprises a charge sustaining (CS) mode and wherein second drive mode comprises a charge depletion (CD) mode.

* * * * *